April 20, 1926.

W. P. KELLETT

RAILWAY CAR

Filed Dec. 26, 1924

Inventor.
William Platts Kellett
by H. J. S. Dennison
Atty.

Patented Apr. 20, 1926.

1,581,744

UNITED STATES PATENT OFFICE.

WILLIAM PLATTS KELLETT, OF BRANTFORD, ONTARIO, CANADA.

RAILWAY CAR.

Application filed December 26, 1924. Serial No. 758,153.

*To all whom it may concern:*

Be it known that I, WILLIAM PLATTS KELLETT, a subject of the King of Great Britain, and resident of the city of Brantford, county of Brant, Province of Ontario, Dominion of Canada, have invented certain new and useful Improvements in Railway Cars, as described in the following specification and illustrated in the accompanying drawings, that form part of the same.

The principal objects of the invention are, to devise a car for use in the transportation of standard transfer vehicles loaded with merchandise from point to point, and to provide a continuous trackway over a train of cars which will enable the trucks being placed and removed by power vehicles, and further to provide means for securing the trucks in place upon the car during transshipment.

The principal features of the invention consist in the novel construction of a car structure, whereby trackways are formed on the deck of the car and adjustable extension members projecting from the ends of the car meet corresponding projections on the adjoining car to form a continuation of the trackway formed on the deck.

In the drawings, Figure 1 is a plan view of one end of a car constructed according to this invention.

Figure 1:
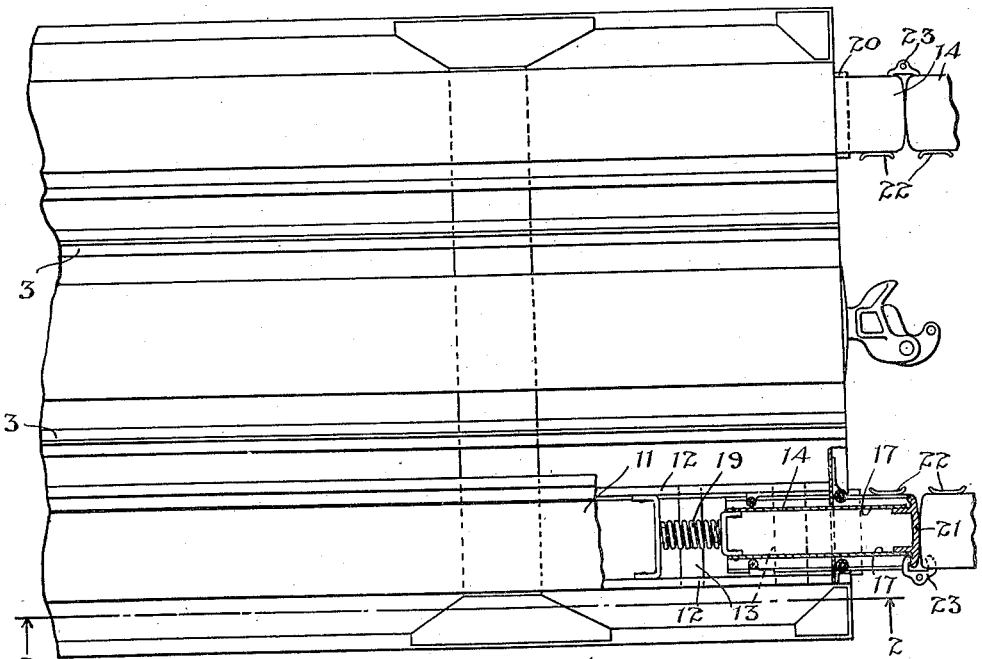
Figure 2:
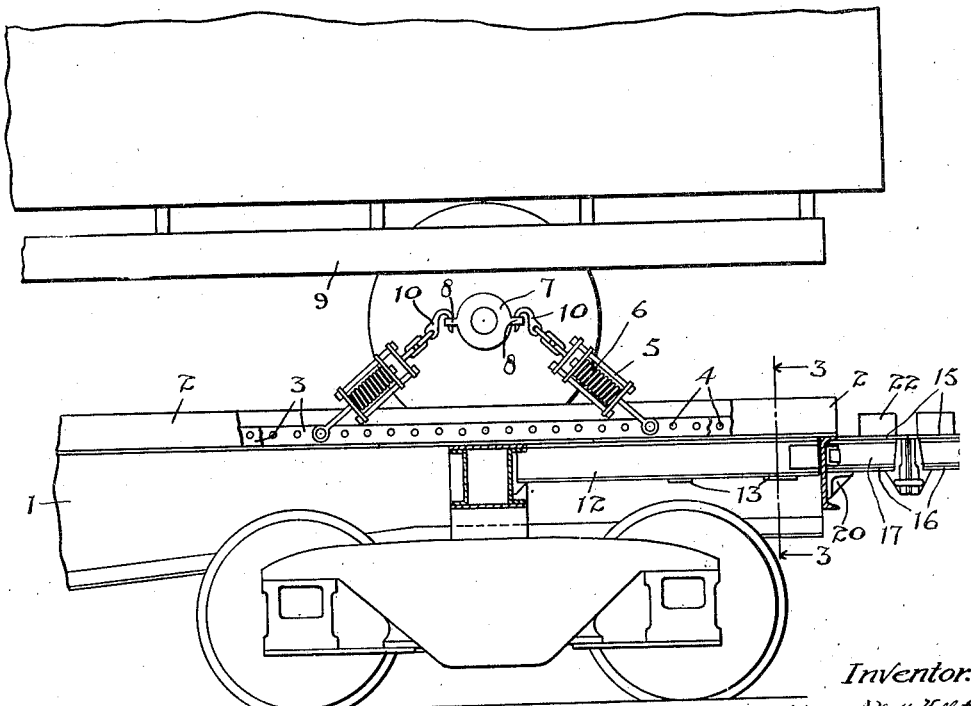
Figure 2 is a longitudinal section and side elevational view of the car end taken through the line 2—2 of Figure 1.
Figure 3:
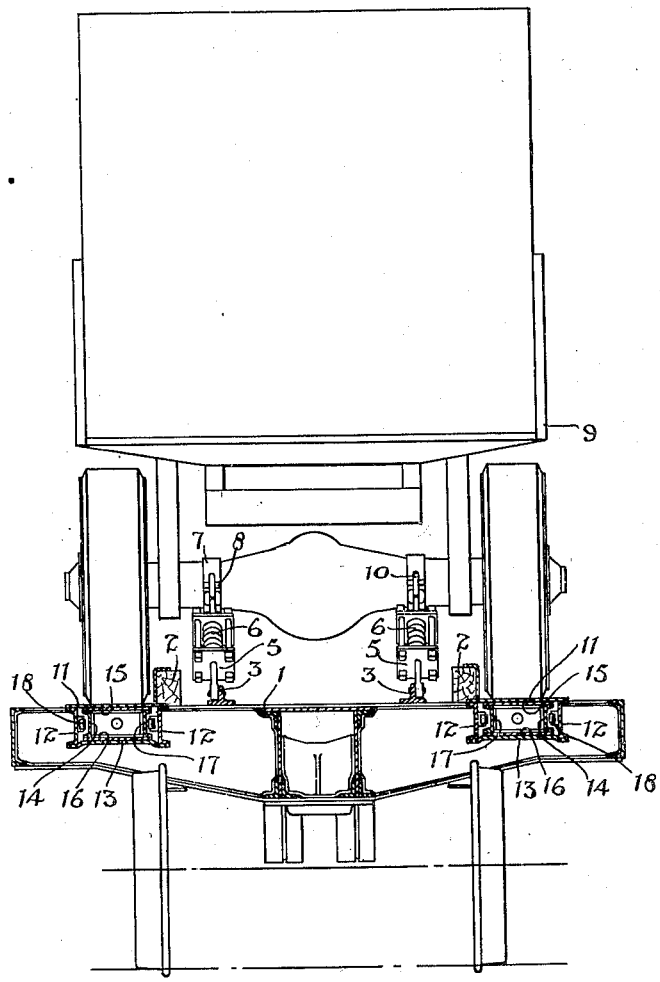
Figure 3 is a cross sectional end elevation view of the car taken through the line 3—3 of Figure 2.

This invention is devised to carry into effect a system of transportation of goods whereby the goods are collected and delivered by standard motor operated vehicles and are transported from point to point over railways on cars specially constructed to form a continuous trackway to receive the trucks and whereby the trucks can be securely anchored during transportation over the railway.

The general structure of the car is that of a standard flat steel car and upon the deck 1 of said car are secured a pair of guides 2 in the form of beams arranged longitudinally and placed parallel and extending from end to end of the car.

The beams may be of timber or of a steel structure as may be desired, or both timber and steel may be used, as shown. These beams are spaced apart a distance slightly narrower than the inner side faces of the wheels of a standard truck so that when a truck is driven on to a car it will be guided by these parallel guides and held securely from lateral movement.

Longitudinally arranged bars 3, here shown in the form of T bars are secured to the deck 1 at the inward side of the guides 2 and the upright flange of the bars 3 is provided with holes 4 equally spaced. These holes are adapted to receive a bolt or the hook end of a shackle 5 which is suitably secured to the axle or body of a truck placed upon the car.

The preferred form of shackle is in the form of a telescoping structure having a strong compression spring 6 arranged between the members thereof.

A collar 7 provided with eyes 8 is shown arranged upon the axle housing of the truck 9 and hook members 10 forming part of the shackles are hooked into these eyes. The shackles are arranged to extend fore and aft from the truck axle so that the truck is held under spring tension in its location upon the car and as the bars 3 extend throughout the length of the car the truck may be secured in any desirable position thereon.

At the ends of the car and below the deck there are formed the horizontally arranged casings 11, here shown formed by the side channels 12 secured to the underside of the deck and connected across the bottom by the plates 13.

Between the deck and the plate 13 are slidably arranged the extension members 14 which are constructed of the top and bottom plates 15 and 16 respectively connected by the side channels 17.

Suitable roller guides 18 are secured on the inner side of the outer channels 12 to engage the side channels of the extension members so that they will not bind in moving in and out.

Heavy compression springs 19 are arranged at the inner ends of the extension members 14.

The members 14 project beyond the end of the car body and slide on the rectangular brackets 20 secured to the end cross bar of the car frame.

The outer ends of the extension members are formed of flanged castings 21 secured to the side channels 17 and top and bottom plates and the side edges of these castings are preferably bevelled slightly to allow for a rocking movement as the cars move in relation to one another in travel.

Side flanges 22 are secured on the inner sides of the extension members 14 and project upwardly above the same in alignment with the outward sides of the longitudinal guides 2 to prevent the truck wheels from slipping sideways or being turned sideways in passage over the extension members.

The abutting ends of the extension members 14 of the adjacent cars may be clamped together, as illustrated, by means of the safety clamps 23 which are placed to grip the side flanges of the end castings 21 of the said extensions. These safety clamps are only placed in position when a train is at rest and the cars are being loaded and unloaded and they prevent the extension members from being separated by the action of the wheels of the truck passing thereover.

Cars constructed as described are otherwise constructed according to railway standards and such a car is capable of use for ordinary purposes, as the guides 3 will not interfere in any way with the placing of loads ordinarily carried on flat cars thereon and the extension members 14 do not interfere in any manner whatsoever with the operation of the car, nor do they require any manipulation to complete the trackway which is formed by the deck of the car.

The extension members in addition to providing a continuous trackway, also form effective buffers to take up end thrust in addition to the ordinary spring accommodation of the draught rigging and a train made up of such cars will be held very solidly together and free from the longitudinal jogging effect incident to the stopping and starting of the train.

Corresponding buffers are arranged upon ramps at terminal stations so that the vehicles may be driven directly on to the cars and as the trackway formed by the extension members provides a continuous trackway from end to end of a train of said cars, the trucks may be loaded on to the cars under power and they may be secured in place by the spring shackle members described.

What I claim as my invention is:—

1. A railway car having longitudinal guides arranged on its deck above the truck wheels, said guides being adapted to receive vehicles with wheels of standard gauge and extending from end to end of the car, and members forming extensions from said guides at the ends of the car supported exclusively from the car and forming with the extension members from the adjacent car a flexible continuous trackway.

2. A railway car having a flat top, a pair of parallelly arranged longitudinal guides extending above said top from end to end of the car, telescopic extension members slidably arranged in the ends of the car, and spring means for holding the said extension members outwardly.

3. A railway flat car having a flat deck and provided with openings in the end beams at either side and spaced equidistant from the transverse centre, members slidably arranged beneath the deck of the car and extending longitudinally through said openings and forming track extensions, means for guiding said slidable members, and spring means for holding said members extended.

4. A railway flat car having a flat deck and parallel longitudinal guides thereon, the ends of the car having rectangular openings therein at the outward sides of said guides, roller guide members arranged beneath the car deck at either side of said openings, members slidable beneath the car deck and extending through said openings and engaging said roller guides, and compression springs arranged at the inward ends of said slidable members.

5. A railway flat car having a flat deck and parallel longitudinal guides thereon, the ends of the car having rectangular openings therein at the outward sides of said guides, rigid brackets secured to the ends of the car frame at the underside of said openings, extension members slidable in said openings and having flat bottoms sliding on said brackets, means for guiding said extension members arranged beneath the car deck and cushion springs arranged at the inner ends.

6. A railway car having a flat top, a pair of parallelly arranged longitudinal guides extending above said top from end to end of the car, telescopic extension members slidably arranged in the ends of the car, flanges projecting upward from the inward side of said extension members, and cushion springs arranged at the inward ends of said extension members.

7. A railway car having a flat top, a pair of parallelly arranged longitudinal guides extending above said top from end to end of the car, telescopic extension members slidably arranged in the ends of the car, bars extending longitudinally of the deck having spaced holes throughout their length, and spring shackle anchor members adapted to be secured in said longitudinal bars to anchor vehicles on said car.

8. A railway car having a flat top, a pair of parallelly arranged longitudinal guides extending above said top from end to end of the car, telescopic extension members slidably arranged in the ends of the car, spring means for holding said extension members outwardly to engage the corresponding extension members of an adjacent car, and means for clamping the ends of the abutting extension members of adjacent cars together.

WILLIAM PLATTS KELLETT.